(No Model.)
W. A. HOLLY.
HAND WEEDER.
No. 537,204. Patented Apr. 9, 1895.
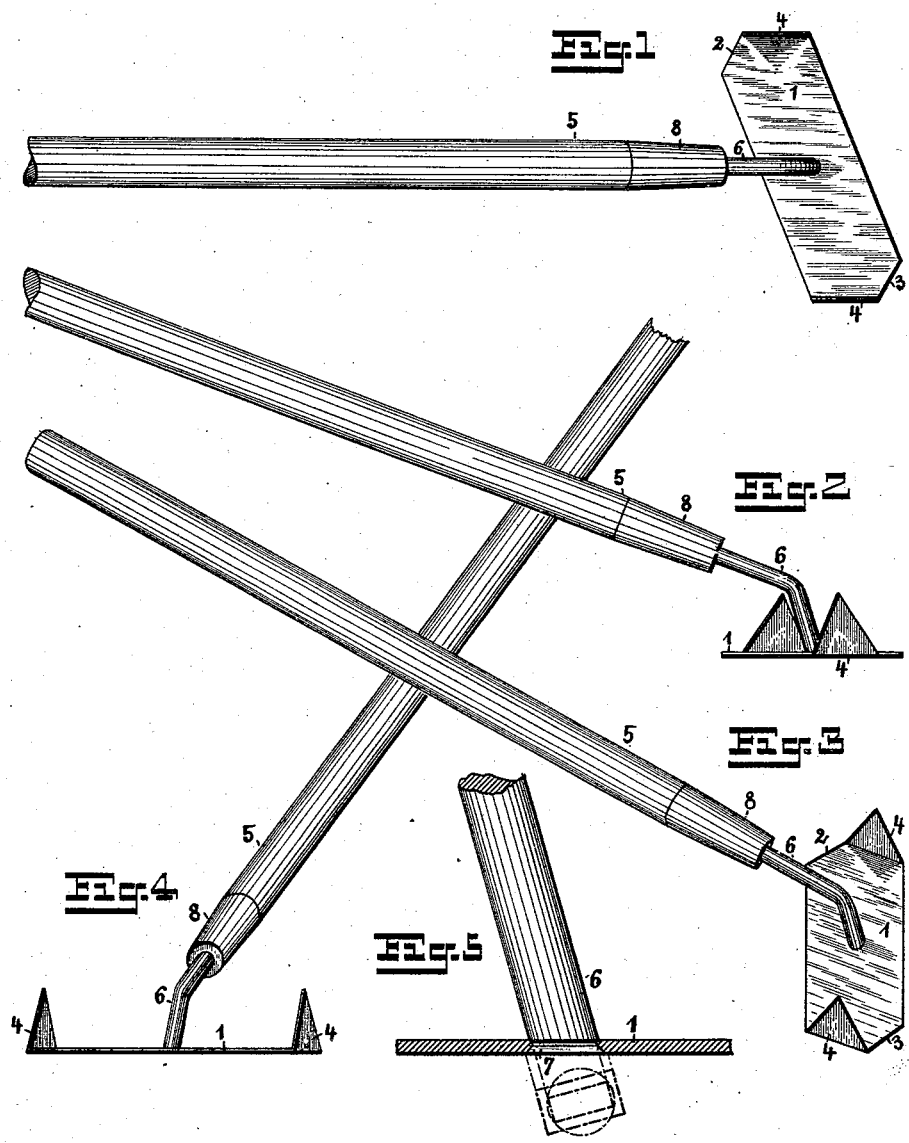
Witnesses:
Emil Reichelt
Fred May
Inventor:
William Amos Holly
by Reichelt & Oltsch
Attys
THE NORRIS PETERS CO., PHOTO-LITHO., WASHINGTON, D. C.

UNITED STATES PATENT OFFICE.

WILLIAM AMOS HOLLY, OF SOUTH BEND, INDIANA.

HAND-WEEDER.

SPECIFICATION forming part of Letters Patent No. 537,204, dated April 9, 1895.

Application filed December 26, 1893. Serial No. 494,664. (No model.)

*To all whom it may concern:*

Be it known that I, WILLIAM AMOS HOLLY, a citizen of the United States, and a resident of South Bend, in the county of St. Joseph and State of Indiana, have invented certain new and useful Improvements in Hand-Weeders, of which the following is a specification.

This invention is especially designed for cutting weeds in gardens between vegetables such as onions, beets, radishes, and other garden plants which are grown in rows closely together and which are liable to be either chopped off or covered by careless or inexpert-cultivation.

The object of my invention is to provide an implement which may be easily handled by persons of ordinary skill and which comprise guards upon the blade to protect the plant and also indicate the line of movement of the implement so clearly that the plants may not be cut off accidentally and also provide the implement with edges effective in cutting the weeds close up to and around the plant in various directions.

In the accompanying drawings:—Figure 1, is a plan view of a garden weeder illustrating my invention; Fig. 2, a side elevation of Fig. 1; Fig. 3, a perspective of the same looking from above; Fig. 4, a similar view looking from one end of the same, and Fig. 5, an enlarged detail partly in section showing the mode of attaching the iron neck of the handle to the blade.

The cutting blade 1, is made of a rectangular plate of thin sheet steel cut off diagonally at its diagonal corners 2, 3, its remaining diagonal corners 4, being turned up diagonally and square with the face of the blade 1, as shown clearly in Figs. 1, 2, and 3, of the drawings. The entire margin of the blade 1 is formed with cutting edges sloping from the upper to the lower surface of the blade to cut in all directions required in the use of the implement.

The blade 1, is secured to the handle 5, by a goose neck staple 6, the blade being made with a hole countersunk on its under face at 7, (see Fig. 5) and the reduced end of the staple being swayed into the countersunk portion in a well known manner, the upper end of the staple 6, being tapered and set into the lower end of the handle and secured thereon by a ferrule 8, as shown more clearly in Fig. 4. The angle of attachment of the handle to the blade is such that it will extend upwardly from the face as shown in Fig. 2, and diagonally from the longitudinal cutting edges of the blade as shown in Fig. 1, thus permitting the handle of the weeder to be held directly over and in line with the line of the furrow, in order that it may be held in a convenient position for use and that the blade may be drawn back and forth in the furrow between the rows of plants to cut down the weeds both in the forward and in the backward movement of the blade. The position of the diagonal cutting edges of the blade being diagonal to the furrow and to the line of movement of the handle, the weeds are more easily cut down than when the blade makes a square cut across the furrow.

The longitudinal faces of the blade 1, being always held horizontally or nearly so—the cutting edges will follow the surface of the ground more easily than if the blade were drawn square across the furrow. The upturned ends 4, of the blade have their faces held directly in the line of the furrow and being flat, pointed and turned square up, they may be held close up to the row of small growing plants without cutting into them, as the position of the blade relatively to the row is always clearly marked by the square upturned ends 4, of the blade the latter serving also to hold the weeds and earth, that have been cut, from falling over and covering the plants. The diagonal corners 2 and 3 of the blade will make a draw cut very close to the plant and the diagonal cutting edges of the upturned ends 4, will also cut all outwardly projecting weeds close to the row of plants without injuring them.

The blade may be held close to the row either upon the right or the one upon the left of the furrow and may be drawn toward or pushed from the handle as may be found most convenient or useful.

What I claim as my invention, and desire to secure by Letters Patent, is—

A garden weeder, having a handle secured thereto, and formed of a rectangular plate of metal having two of its diagonal corners turned up square with its face and the remaining corners cut off diagonally, the entire margin of the blade being formed with cutting edges, substantially as described.

In testimony that I claim the foregoing as my invention I have signed my name in presence of two subscribing witnesses.

WILLIAM AMOS HOLLY.

Witnesses:
OTTO B. REICHELT,
FRED MAY.